US011402020B2

(12) United States Patent
Augustin, Sr. et al.

(10) Patent No.: US 11,402,020 B2
(45) Date of Patent: Aug. 2, 2022

(54) PISTON WITH MULTIAXIAL BEARING AND PISTON BOWL

(71) Applicant: Cummins Inc., Columbus, IN (US)

(72) Inventors: Kevin C. Augustin, Sr., Greenwood, IN (US); Florin Mocanu, Columbus, IN (US); Eric M. Osecky, Indianapolis, IN (US); Robert G. Sperry, Columbus, IN (US)

(73) Assignees: CUMMINS INC., Columbus, IN (US); ACHATES POWER, INC., San Diego, CA (US)

(*) Notice: Subject to any disclaimer, the term of this patent is extended or adjusted under 35 U.S.C. 154(b) by 0 days.

(21) Appl. No.: 17/125,582

(22) Filed: Dec. 17, 2020

(65) Prior Publication Data

US 2021/0270367 A1 Sep. 2, 2021

Related U.S. Application Data

(60) Provisional application No. 62/982,643, filed on Feb. 27, 2020.

(51) Int. Cl.
*F16J 1/02* (2006.01)
*F02F 3/28* (2006.01)
*F16J 1/08* (2006.01)
*F16J 1/16* (2006.01)

(52) U.S. Cl.
CPC .................. *F16J 1/02* (2013.01); *F02F 3/28* (2013.01); *F16J 1/08* (2013.01); *F16J 1/16* (2013.01)

(58) Field of Classification Search
CPC . F16J 1/02; F16J 1/08; F16J 1/16; F16J 1/18; F02F 3/28
See application file for complete search history.

(56) References Cited

U.S. PATENT DOCUMENTS

| 2,065,509 A | * | 12/1936 | Crawford | F16J 1/18 |
| | | | | 74/579 E |
| 2,069,594 A | * | 2/1937 | Schneider | F16J 1/16 |
| | | | | 92/186 |

(Continued)

FOREIGN PATENT DOCUMENTS

| DE | 1964742 A1 | * 10/1970 | F16J 1/16 |
| EP | 2948664 B1 | 6/2017 | |

(Continued)

*Primary Examiner* — Hung Q Nguyen
(74) *Attorney, Agent, or Firm* — Faegre, Drinker, Biddle & Reath, LLP

(57) ABSTRACT

The present disclosure provides a piston for an internal combustion engine, the piston having a piston body including a first bearing saddle defining a first axis and a second bearing saddle defining a second axis, the first axis being parallel to and spaced from the second axis. A bearing is also provided, the bearing having a first journal having a first body, longitudinal ends, and lateral edges, the first journal defining a first axis, the first journal disposed about approximately 180 degrees of the first axis and a second journal having a second body and defining a second axis, the second journal disposed about approximately 180 degrees of the second axis, the second journal operable to be positioned abutting one of the lateral edges of the first journal when the first and second journals are positioned with the piston.

20 Claims, 14 Drawing Sheets

(56) References Cited

U.S. PATENT DOCUMENTS

| | | | | |
|---|---|---|---|---|
| 2,687,930 | A * | 8/1954 | Smith | F16J 1/16 403/150 |
| 3,555,972 | A * | 1/1971 | Hulsing | F02F 3/22 92/157 |
| 3,789,743 | A * | 2/1974 | Sihon | F16J 1/16 92/187 |
| 3,983,793 | A * | 10/1976 | Beardmore | F16J 1/02 92/190 |
| 4,068,563 | A * | 1/1978 | Ryan | F16J 1/08 123/41.38 |
| 4,269,083 | A * | 5/1981 | Wandel | F16J 1/16 123/197.3 |
| 4,635,596 | A * | 1/1987 | Nakano | F16J 1/14 123/193.6 |
| 4,854,746 | A | 8/1989 | Baugh et al. | |
| 5,112,145 | A * | 5/1992 | MacGregor | F02F 3/0069 384/286 |
| 5,694,829 | A * | 12/1997 | Onodera | F02F 3/00 123/193.6 |
| 6,120,189 | A * | 9/2000 | Beagle | F16J 1/16 384/255 |
| 9,103,305 | B2 | 8/2015 | Hayman et al. | |
| 9,759,119 | B2 | 9/2017 | MacKenzie et al. | |
| 9,841,049 | B2 | 12/2017 | Klyza | |
| 10,119,493 | B2 | 11/2018 | Wagner et al. | |
| 10,180,115 | B2 | 1/2019 | Burton et al. | |
| 2014/0238360 | A1 * | 8/2014 | Dion | F16J 1/16 123/51 B |
| 2015/0122227 | A1 * | 5/2015 | Abani | F02B 23/0624 123/51 R |
| 2018/0202346 | A1 * | 7/2018 | Mackenzie | F02B 75/28 |

FOREIGN PATENT DOCUMENTS

| | | | |
|---|---|---|---|
| EP | 3030768 B1 | 11/2017 | |
| GB | 2346196 A * | 8/2000 | F16J 1/16 |

\* cited by examiner

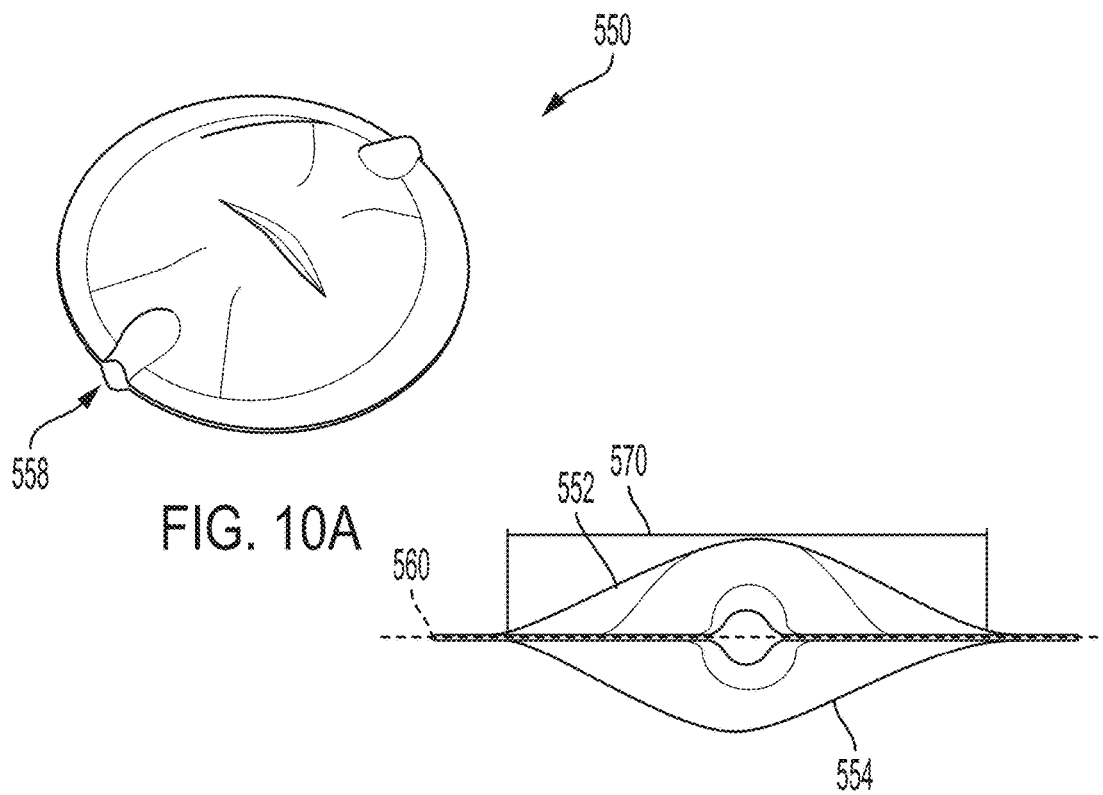
FIG. 10A
FIG. 10B
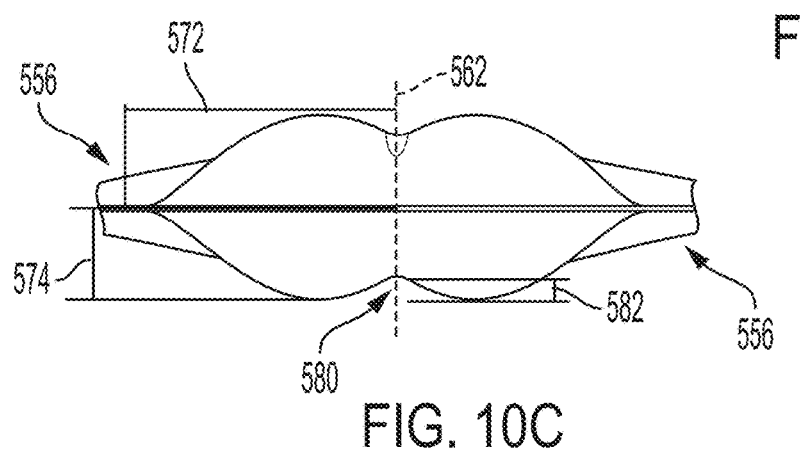
FIG. 10C

PISTON WITH MULTIAXIAL BEARING AND PISTON BOWL

RELATED APPLICATIONS

This application claims priority to U.S. Provisional Patent Application No. 62/982,643, filed Feb. 27, 2020, the subject matter of which is incorporated herein by reference.

STATEMENT OF GOVERNMENTAL RIGHTS

This invention was made with government support under Other Transaction Authority (OT) agreement number W56HZV-16-9-0001, awarded by the United States Army. The government has certain rights in the invention.

FIELD OF THE DISCLOSURE

The present disclosure generally relates to internal combustion engine piston design, and more particularly to piston bearings and piston bowls.

BACKGROUND

Efficiency, durability, and manufacturability of components are all important consideration when designing an internal combustion engine. Certain innate limitations exist in efficiency, durability, and manufacturability of those components, and specifically with regard to pistons. Piston design can be difficult as various components within, as well as separate from, the piston experience repetitive movements, extreme conditions (e.g., high temperatures and pressures, rapid changes in temperature, pressure and direction, hard contact with other components, and so forth). Furthermore, certain designs may present inherent manufacturability difficulties such as precise dimensions in restricted or difficult-to-access spaces.

Furthermore, costs may be increased by difficult manufacturing or assembly processes, including having more than one part that can has to be manufactured and installed separately. Having more parts and parts that might be difficult to assemble increases the cost and decreases efficiency of the manufacturing process.

SUMMARY

According to one embodiment, the present disclosure provides a piston for an internal combustion engine, comprising a piston body including a first bearing saddle defining a first axis and a second bearing saddle defining a second axis, the first axis being parallel to and spaced from the second axis.

In another embodiment, the present disclosure provides a bearing for a piston in an internal combustion engine, the bearing comprising: a first journal having a first body, longitudinal ends, and lateral edges, the first journal defining a first axis, the first journal disposed about approximately 180 degrees of the first axis, the first journal having a first thickness along the first body, the lateral edges including a chamfer or bevel; and a second journal having a second body and defining a second axis, the second journal disposed about approximately 180 degrees of the second axis, the second journal having a second thickness along the second body that is substantially similar to the first thickness of the first journal, the second journal operable to be positioned abutting one of the lateral edges of the first journal when the first and second journals are positioned with the piston.

In another embodiment, the present disclosure provides a piston for an internal combustion engine, the piston comprising: a piston body including a bearing saddle; a bearing positioned with the bearing saddle; and a clamp for retaining the bearing with the bearing saddle.

In another embodiment, the present disclosure provides an internal combustion engine comprising: a piston having a piston crown defining a first combustion surface, the first combustion surface being symmetric across a first plane and across a second plane, the first plane being perpendicular to the second plane; an opposing member positioned opposing the piston crown, the opposing member defining a second combustion surface, the second combustion surface being symmetric to the first combustion surface of the piston crown.

In another embodiment, the present disclosure provides a piston comprising: a piston crown including first and second longitudinal ends, the piston crown defining a combustion surface including a ridge positioned between the first and second longitudinal ends of the piston crown, the ridge being formed to redirect an injection charge away from the combustion surface.

BRIEF DESCRIPTION OF THE DRAWINGS

The above-mentioned and other features of this disclosure and the manner of obtaining them will become more apparent and the disclosure itself will be better understood by reference to the following description of embodiments of the present disclosure taken in conjunction with the accompanying drawings, wherein:

FIGS. 10A-10C show various views of a combustion chamber having a center ridge, according to one embodiment;

Figures 1A, 1B:
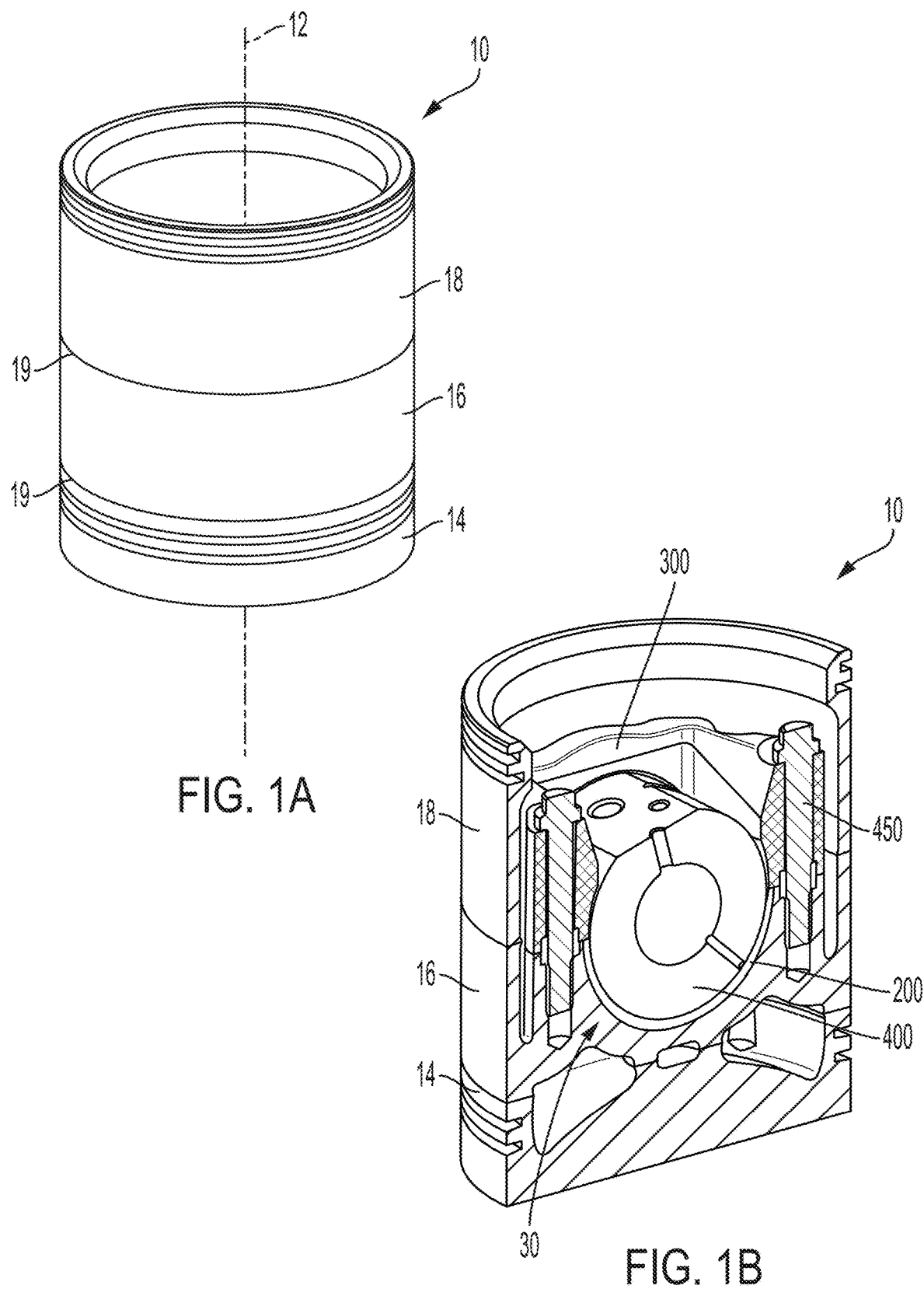
FIG. 1A is a perspective view of a piston having a crown, a body, and a skirt, the piston having an outline of a cross section of the crown, body, and skirt, according to one embodiment.
FIG. 1B is a perspective view of a cross section of a piston, the piston including a crown, body, skirt, bearing, clamp, pin, and fasteners, according to one embodiment.

Although the drawings represent embodiments of the various features and components according to the present disclosure, the drawings are not necessarily to scale and certain features may be exaggerated in order to better illustrate and explain the present disclosure. The exemplification set out herein illustrates embodiments of the disclosure, and such exemplifications are not to be construed as limiting the scope of the disclosure in any manner.

DETAILED DESCRIPTION OF EMBODIMENTS OF THE DISCLOSURE

For the purpose of promoting an understanding of the principles of the disclosure, reference will now be made to the embodiments illustrated in the drawings, which are described below. It will nevertheless be understood that no limitation of the scope of the disclosure is thereby intended. The disclosure includes any alterations and further modifications in the illustrated device and described methods and further applications of the principles of the disclosure, which would normally occur to one skilled in the art to which the disclosure relates. Moreover, the embodiments were selected for description to enable one of ordinary skill in the art to practice the disclosure.

As described below, in various embodiments the present disclosure provides piston features and piston manufacturing techniques based on the piston features and designs which permits fabrication of an efficient and durable piston. Such features include, for example, piston saddles, piston bearings, piston weldments, piston clamps, and piston bowls.

Referring now to FIGS. 1A and 1B, a piston 10 is shown. As seen in FIG. 1A, the piston 10 is a generally cylindrical structure having a central axis 12. In general, the piston 10 includes a crown 14, a body 16, and a skirt 18. In this example, the crown 14 and the body 16 and the skirt 18 are coupled together at weld lines 19 by various mean (e.g., friction welding, induction welding, laser welding, additive manufacturing). An outline of a cross section of the crown 14, the body 16, and the skirt 18 is shown in FIG. 1A, and a cross sectional view of the piston 10 is shown in FIG. 1B.

As seen in FIG. 1B, the piston 10 includes a bearing 200, a clamp 300, a pin 400 for a connecting rod (not shown), and fasteners 450. The body 16 of the piston 10 includes a coupling portion 30 configured to receive the bearing 200, the clamp 300, the pin 400 or a short arm of a connecting rod (not shown), and fasteners 450. The skirt 18 includes an axial opening 40 configured to permit access to the coupling portion 30 of the body 16 when the body 16 and the skirt 18 are coupled.

Figure 2:
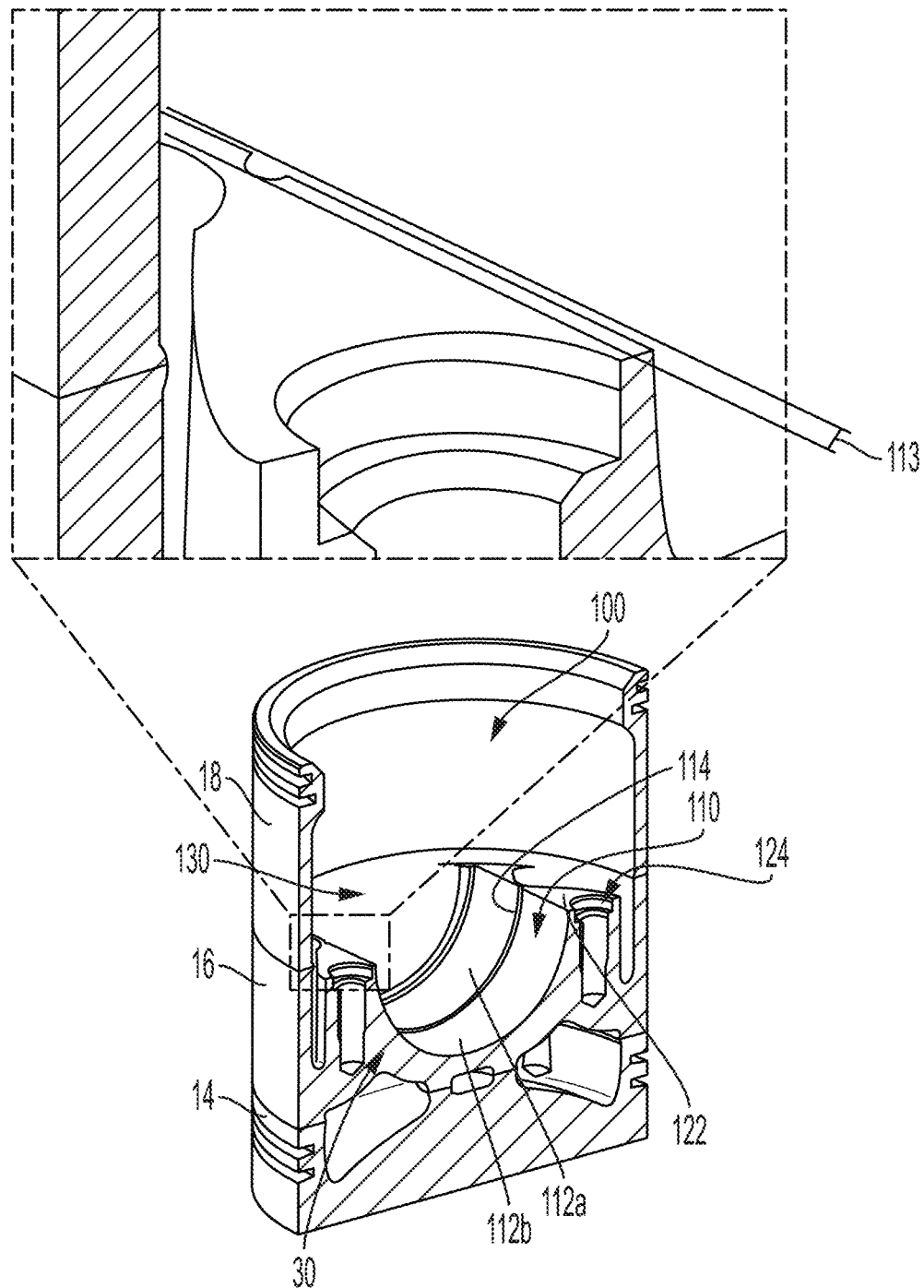
FIG. 2 is a is a perspective view of a cross section of the crown, body, and skirt of a piston, including a close-up view of the edges of staggered bearing saddles, according to one embodiment.

Referring now to FIG. 2, a cross section of a piston 10 is shown with various expanded views enlarged for understanding. The body 16 of the piston 10 is coupled to the crown 14 and the skirt 18. The body 16 of the piston 10 has an interior 100 that includes a bearing saddle 110 operable to receive a bearing 200 (which will be discussed hereafter) and a coupling portion 30 operable to receive a clamp 300 (which will be discussed hereafter).

Figure 5:
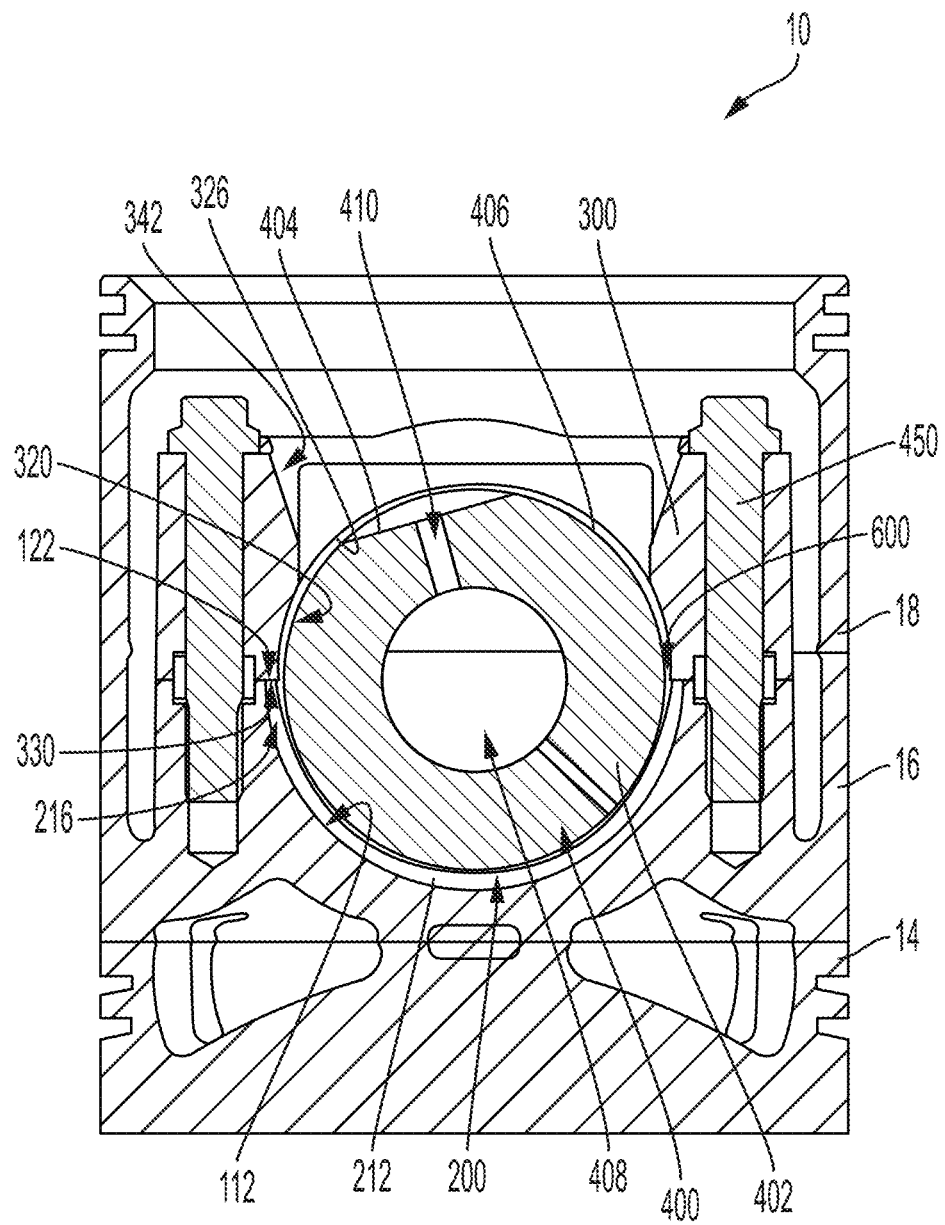
FIG. 5 is a front view of a cross section of a piston, the piston including a crown, body, skirt, bearing, clamp, pin, and fasteners, according to one embodiment.

With reference to the bearing saddle 110, in some embodiments, the bearing saddle 110 includes a plurality of saddle sections 112. For example, FIG. 2 shows a cross section where a first saddle section 112a and a partial view of a second saddle section 112b are shown. The piston 10 may include any number of saddle sections 112, including one, two, three, four, five or more saddle sections 112. The bearing saddle 110, including the saddle sections 112, may be integrally formed into the body 16 of the piston 10, for example, by subtractive manufacturing techniques such as milling or by additive manufacturing techniques such as three-dimensional printing. Each of the saddle sections 112 is formed in an arcuate shape operable to receive the bearing 200 and ultimately the pin 400 of a connecting rod (the pin 400 as seen in FIGS. 1A and 5). Thus, each saddle section 112 is disposed about an axis (not shown) and includes a predetermined radius and arc length or arc angle. For example, FIG. 2 demonstrates saddle sections 112 that are formed having substantially same radius and arc angle.

As can be seen in FIG. 2, the saddle sections 112 are positioned axially offset relative to each other. The saddle sections 112 are each defined in the body 16 of the piston 10 such that each saddle section 112 defines an axis (not shown). Each axis defined by the corresponding saddle section 112 is parallel to each of the remaining axes. In some embodiments, the axis of the first saddle section 112a and the axis of the third saddle section (not shown) are aligned and the axis of the second saddle section 112b is spaced from the aligned axes of the first saddle section 112a and third saddle section (not shown). When each of the saddle sections 112 includes the same arc length and arc radius, the saddle sections 112 are positioned such that the surfaces are staggered, or in other words, not flush for at least a portion of the surfaces of the saddle sections 112. For example, a piston 10 having a bearing saddle 110 may include a first, second, and third saddle section 112a, 112b, 112c. The first and third saddle section 112a, 112c may be positioned at an off-offset or shifted position about ¼ mm laterally outward such that the axes (not shown) of the first and third saddle sections 112a, 112c are offset radially outward from the central axis 12 of the piston 10 toward one side of the outer circumference. The second saddle section 112b may then be positioned at an offset or shifted position about ¼ mm laterally outward in the opposite direction of the first and third saddle sections 112a, 112b such that the axis (not shown) of the second saddle section 112b is offset radially outward from the central axis 12 of the piston 10 toward the opposite side of the outer circumference. As will be discussed hereafter, the offset saddle sections 112 and ultimately the bearing journals 212 (seen in FIG. 3, for example) allow for lubricant loading between the components of the piston 10. A circumferential channel 114 or channels may be defined in the bearing saddle 110 between each of the saddle sections 112. The circumferential channel 114 may act as a reservoir or loading channel for lubricant, for example, oil. It will be noted that the circumferential channels 114 and the offset 113 of the saddle sections 112 may also facilitate proper seating of the bearing 200 within the bearing saddle 110.

With further reference to FIG. 2, the body 16 of a piston 10 is provided with a coupling portion 30 operable for receiving and engaging a clamp 300 (seen in FIGS. 1B and 4, for example). The coupling portion 30 may include a receiving surface 122 and a securing feature 124. The receiving surface 122 includes a substantially flat surface in the interior 100 of the body 16 of the piston 10. The receiving surface 122 is positioned at the ends of the bearing saddle 110. The securing feature 124 may include a recess operable to receive a fastener.

Various other features may be included in the body 16 of the piston 10 for serving various other functions or for permitting the manufacture of the components. For example, as seen in FIG. 2, recesses 130 may be formed in the body 16 of the piston 10 at the axial ends of the bearing saddle 110. The recesses 130 may serve to allow for manufacturing the bearing saddle 110 using subtractive manufacturing such as machining. The recesses 130 may also serve to decrease the mass of the piston 10.

Figure 3:
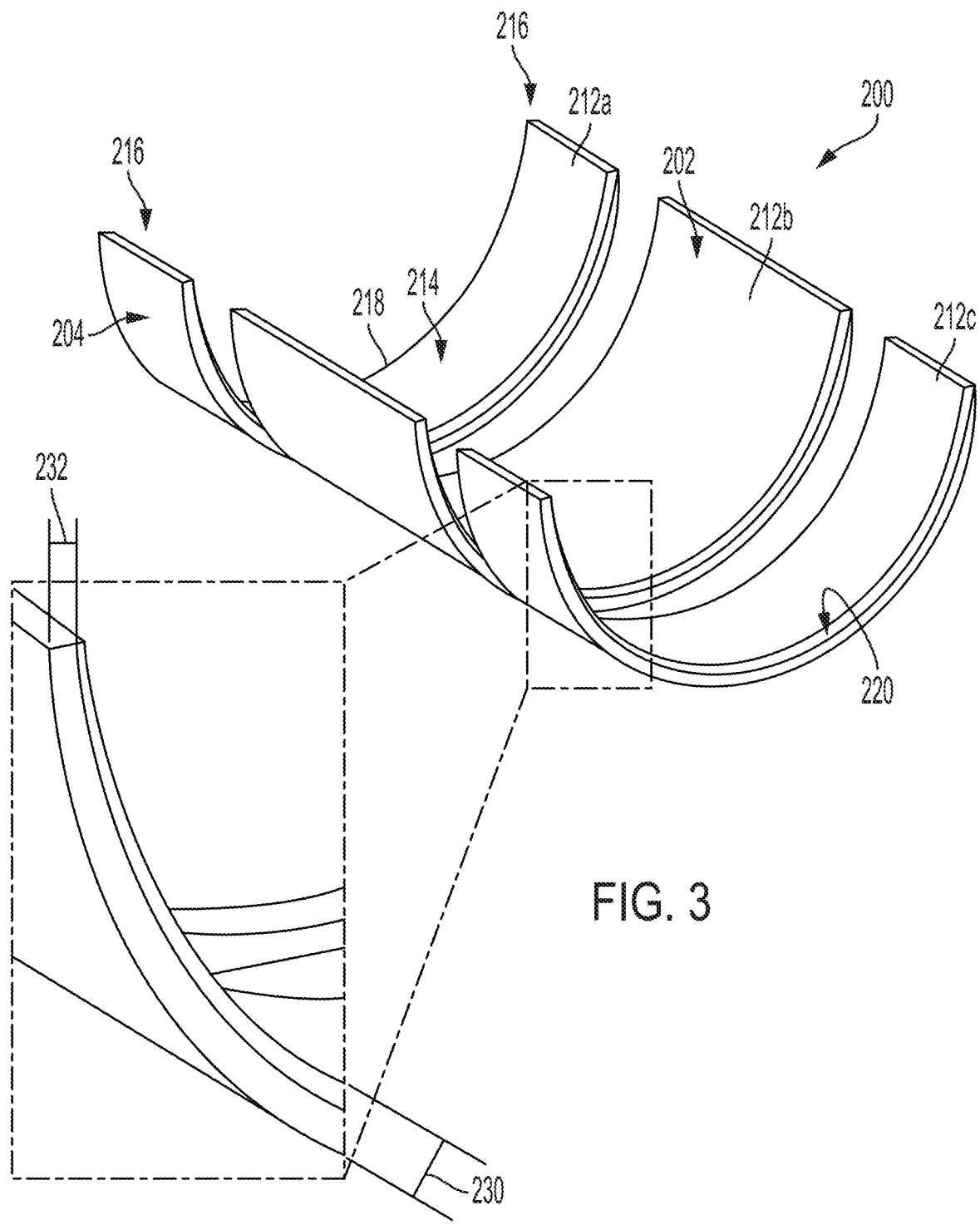
FIG. 3 is a perspective view of a bearing, including a close-up view of an edge of a journal of the bearing, according to one embodiment.

Now referring to FIG. 3, a bearing 200 is provided for use with the bearing saddle 110 of the body 16 of the piston 10. The bearing 200 includes an interior surface 202 and an exterior surface 204. The bearing 200 may be divided into a plurality of journals 212. As used herein, the term "journal" generally describes a component of a bearing that is separate and distinct from other journals, but when used in connection with the other journals in the disclosed piston 10, the journals operate as a single bearing (e.g., a uniaxial bearing when aligned and biaxial or multi-axial bearing when staggered. However, it is understood that the journals could likewise be described as each being a separate bearing. It will be understood by those of skill in the art that this distinction is a mere semantical distinction, and the descriptions included herein include both expressions. For simplicity of discussion, the former description is used consistently throughout the description but could also be described otherwise. For example, the bearing 200 may include three distinct or separate journals 212. Each journal 212 includes a journal body 214, longitudinal ends 216, and lateral edges 218. The interior surface 202 and exterior surface 204 of the bearing 200 may be defined on the each of the journals 212 collectively. Although the bearing 200 of FIG. 3 includes the distinct journals 212 shown as spaced, when positioned with the corresponding saddle sections 112, the journals 212 are positioned proximate or abutting each other at the lateral edges 218. Each journal 212 may include a chamfered or beveled edge at the lateral edge 218. The chamfers or bevels 220 on the interior surface 202 of the lateral edges 218 of the journals may act as a circumferential oil loading channel 222 (not shown when the journals 212 are shown as spaced) for the bearing 200 and the corresponding components when the journals 212 are positioned abutting each other. It is within the scope of this disclosure to include the chamfer or bevel 220 on the exterior surface 204 or both the interior and exterior surfaces 202, 204 at the lateral edges 218 of one or more of the journals 212. In some embodiments, an axial loading channel (not shown) may be defined along the interior surface 202 and/or the exterior surface 204 of the bearing 200, such that the axial loading channel extends along at least a portion of the length of each of the journals 212.

According to some embodiments, the bearing 200 may include a first journal 212a, a second or center journal 212b, and a third journal 212c. The bearing saddle 110 of the body 16 may include a corresponding saddle section 112 for each of the bearing journals. For example, the bearing saddle 110 includes a first saddle section 112a that corresponds to the first journal 212a, a second saddle section 112b that corresponds to the second journal 212b, and a third saddle section 112c that corresponds to the third journal 212c. It is contemplated that any number of saddle sections 112 and corresponding journals 212 may be implemented.

As can be seen in at least FIG. 3, each journal 212 of the bearing 200 may form an arcuate shape extending about 180 degrees about a central axis (not shown). Although various arc angles are contemplated, journals 212 having an arc angle of 180 degrees will be discussed in greater detail hereafter. Each journal body 214 of the journals 212 may include a journal body thickness 230. The journal body thickness 230 of each journal body 214 of the journal 212 may be substantially equal. The journal body thickness 230 may also be uniform along each journal body 214. The longitudinal ends 216 of the journals 212 may include a second thickness 232 that is less than the journal body thickness 230. For example, the longitudinal ends 216 of the journals 212 may be tapered such that the journal body thickness 230 is greater than the second thickness 232 at the longitudinal ends 216. As can be seen in FIG. 5, the journals 212 may begin to taper in thickness at about 15 degrees from the ends of the longitudinal ends 216 of the journals 212. This may provide relief and permit clearance for the associated components that will be discussed hereafter.

Because the journals 212 may be separate components, the bearing 200 may be manufactured in a repeatable and accurate fashion. The bearing must be formed of materials sufficient to withstand the wear of repetitive loads. As such, it may be advantageous to simplify the manufacture of such components.

Figure 4A:
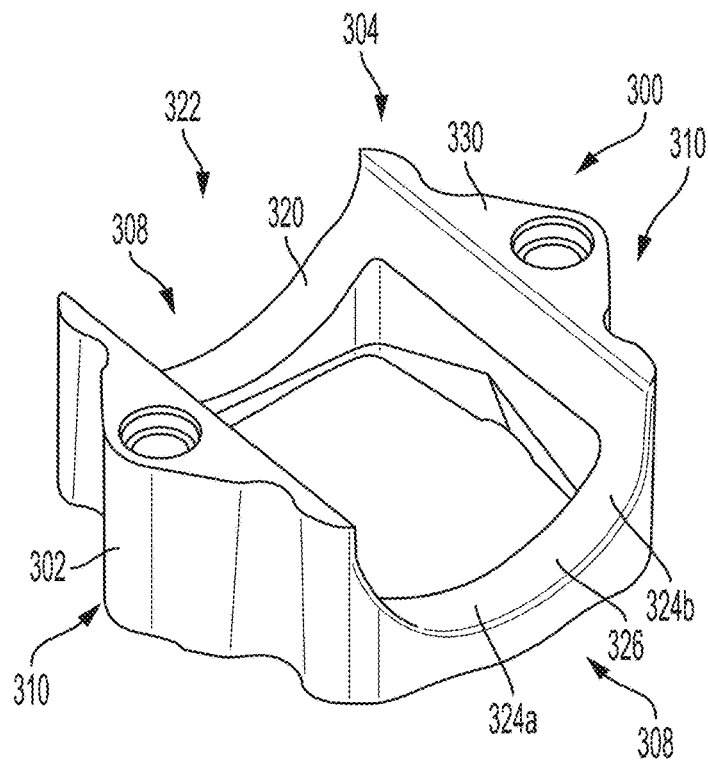
FIGS. 4A and 4B are perspective views of a clamp, according to one embodiment.
Figure 4B:
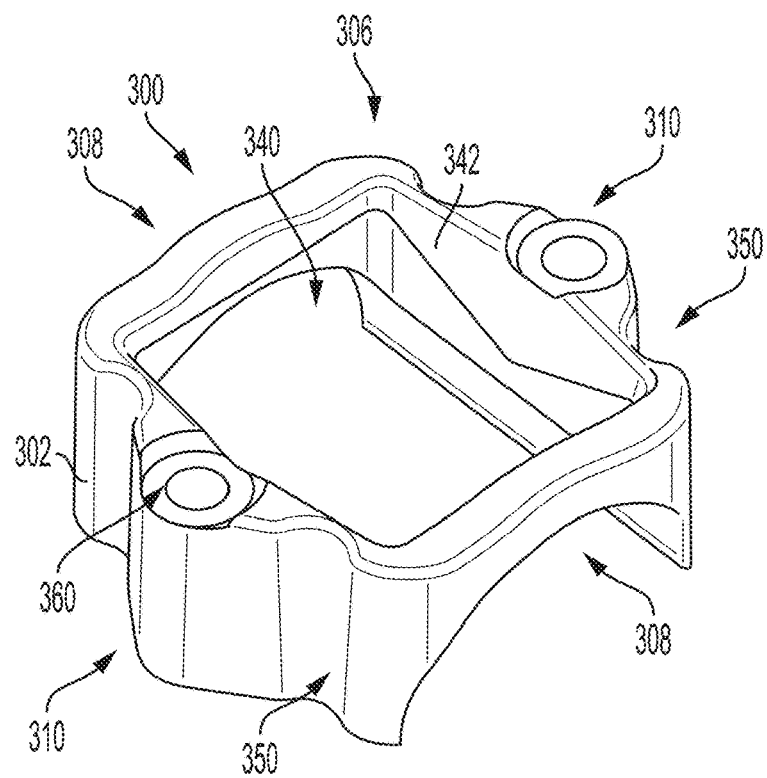

Referring now to FIGS. 4A and 4B, a clamp 300 is provided. The clamp 300 is operable to be secured with the body 16 of the piston 10. The clamp 300 includes a clamp body 302 having a first side 304, a second side 306, axial ends 308, and lateral ends 310. The first side 304 may include a pin receiving surface 320 defining a pin recess 322.

Referring specifically to FIG. 4A, the pin receiving surface 320 and the pin recess 322 are formed to facilitate securing and positioning of the pin 400 relative to the clamp 300, the bearings 200, and the body 16 of the piston 10. As can be seen in FIGS. 4A and 4B, the pin receiving surface 320 forms a substantially arcuate shape. However, it will be noted that in some embodiments, the pin receiving surface 320 may be formed of a plurality of arcs, each arc being disposed about a separate axis (not shown) spaced from the axes of the other arcs. For example, FIGS. 4A and 4B demonstrate a clamp 300 having a pin receiving surface 320 defined by at least three arcs 324, where at least two of the arcs 324a, 324b are disposed about axes that are parallel and spaced from each other. By having the different arcs disposed about the spaced axes, the pin receiving surface 320 may not be formed by a single continuous arc. This results in the pin receiving surface 320 having at least one transition ridge 326. The transition ridge 326 may be operable to allow the pin 400 to transition or teeter between different positions to allow for lubricant loading. The first side 304 of the clamp 300 may also include a crush surface 330. The crush surface 330 is operable to contact the body 16 of the piston 10 and the bearing 200.

Referring now to FIG. 4B, the clamp 300 may include a second side 306. The second side 306 includes a connecting rod opening 340 defined through the clamp body 302. The connecting rod opening 340 allows for a pin (not shown) to be received by the pin receiving surface 320 and to have the arm (not shown) of the connecting rod (not shown) to extend from the pin through the connecting rod opening 340. As can be seen in FIG. 4B, the body includes tapered surfaces 342 that provide clearance between the connecting rod (not shown) and the clamp 300 when the piston 10 is in use and the connecting rod articulates as the pin 400 rotates and teeters within the bearing 200 and clamp 300. As seen in both FIGS. 4A and 4B, the clamp body 302 defines tapered recesses 350 positioned at the lateral ends 310 of the clamp body 302. The tapered recesses 350 are operable to support cooling the piston 10 during use. For example, the tapered recesses 350 allow fluid to flow through portions of the piston 10 to transfer heat from the piston to the fluid. The recesses 350 are tapered to promote funneling or redirection of the fluid to the appropriate location during use.

The clamp 300 may also include a clamp securing feature 360 that allows the clamp 300 to be secured to the body 16 of the piston 10. For example, the clamp securing feature 360 may include a through aperture through which a fastener 450 (e.g., a bolt) may be passed and fastened to another element. It is within the scope of this disclosure that any system for fastening the various components may be implements and is therefore not limited to those discussed in detail.

Referring now to FIG. 5, a front view of a cross section of the piston 10 of FIG. 1B is shown. The piston 10 includes a pin 400 secured between the bearing 200, and the clamp 300. The pin 400 includes a pin body 402. In some embodiments, the pin body 402 may be substantially cylindrical. The pin body 402 may include a connecting rod (not shown) extending directly from the pin 400, or the pin body 402 may include a coupling surface 404 that is operable to couple to a connecting rod (not shown). The pin body 402 defines a contact surface 406 which is operable to interface and rotate with respect to the bearing 200 and the clamp 300. The pin 400 may also include channels 410 that extend through the pin body 402 into an interior chamber 408. The channels 410 and the interior chamber 408 may be operable to store and distribute lubricant to the various components of the piston 10 (e.g., the bearing 200 and clamp 300). For example, the interior chamber 408 may act as an oil reservoir.

Piston Assembly

Turning now to a discussion of the piston 10 with its components assembled together, FIG. 5 provides a cross sectional view of the piston 10 with the piston crown 14, body 16, skirt 18, bearing 200, clamp 300, pin 400, and fasteners 450 assembled together. The pin 400 is positioned between and retained by the bearing 200 and clamp 300. The bearing 200 is positioned within the bearing saddle 110 of the body 16 of the piston 10. The clamp 300 is secured to the body 16 of the piston 10 via fasteners 450.

As each component has certain features of interest specifically included because of the interactions between the various components, those will be described in relation to each other. As previously discussed, each journal 212 of the bearing 200 is operable to be positioned with a corresponding saddle section 112 of the bearing saddle 110. Because the bearing saddle sections 112 may be axially offset from each other, as the journals 212 of the bearing 200 are positioned in the corresponding saddle section 112, the journals 212 are likewise axially offset from each other. Thus, a biaxial or multi-axial bearing is achieved by placing the journals 212 of the bearing 200 within the bearing saddle 110, the bearing saddle ultimately defining the position of the axis of each of the journals 212. By incorporating the axial offset into the bearing saddle 110, the manufacturing process may be simplified and performance of the piston 10 increased (e.g., traditional, individual half bearings may be used to form a biaxial or multi-axial bearing instead of machining a single bearing with offset sections). The interface between the bearing saddle 110 and the bearing 200 is static when in use (meaning the parts do not move relative to one another). It may be advantageous to simplify the manufacture of the parts that may have more demanding material and load requirements during use (e.g., the bearing 200, clamp 300, and pin 400 that each have a kinematic interface).

The clamp 300, and specifically the pin receiving surface 320, may be formed to include a similar curvature. Specifically, the pin receiving surface 320 of the clamp 300 may be formed such that an imaginary cylinder (not shown) extending from each of the journals 212 is defined along the pin receiving surface 320 of the clamp 300 between the axial ends 308 of the clamp 300. This allows the pin 400 to transition between various positions when positioned with the bearing 200 and clamp 300 which allows for reloading of the lubricant. A slight relief can be seen in FIG. 5 between the clamp 300 and the pin 400 which is facilitated by the aforementioned feature. A result of the non-concentric cylindrical reliefs in the pin receiving surface 320 of the clamp 300 includes the transition ridges 326 of the pin receiving surface 320. The transition ridges 326 may be operable to stabilize the pin 300 within the bearing 200 and clamp 300 when not transitioning between the various positions, thus reducing wear and stress due to loose fitment of the components.

It is noted that the fitment of the journals 212 of the bearing 200 is facilitated by both the bearing saddle 110 and the clamp 300. For example, FIG. 5 shows a journal 212 that has an arc angle of 180 degrees. The longitudinal ends 216 of each of the journals 212 is substantially flush with the receiving surface 122 of the body 16 of the piston 10. The crush surface 330 of the clamp 300 is operable to contact the longitudinal ends 216 of each of the journals 212 and the receiving surface 122 of the body 16 of the piston 10, such that the clamp 300 is in secure contact with the body 16 of the piston 10 and the journals 212 of the bearing 200 are seated properly within the bearing saddle 110. Thus the clamp 300, and specifically the crush surface 330 is operable to facilitate placement and retention of the bearing 200 relative to the body 16 of the piston 10. The crush surface 330 of the clamp 300 is operable to achieve preload of the bearing 200 when the clamp 300 is torqued in place. This may provide a uniform load to each of the longitudinal ends 216 of the journals 212.

As previously discussed, each of the journals 212 of the bearing 200 may include a taper in thickness at each of the ends. The taper provides a bearing-pin relief 600 which reduces wear on both the bearing 200 and the pin 400, reduces biaxial surface area, and permits kinematic clearance during kinematic shifts of the pin 400. The bearing-pin relief 600 may also serve as a loading channel for lubricant. The bearing-pin relief 600 is operable to provide the clearance needed for the pin 400 to transition or teeter between the different positions as previously discussed.

FIG. 5 provides another view of the tapered surfaces 342 of the clamp 300. The tapered surfaces 342 are positioned such that the connecting rod (not shown) does not contact the clamp 300, thus reducing wear and stress or damage to the structural integrity of the components. The tapered surfaces 342 provide ample clearance for oscillating offset of the pin 400 via the journals 212. The tapered surfaces 342 also provide reduce clearance to minimize piston unloading forces.

Figure 6:
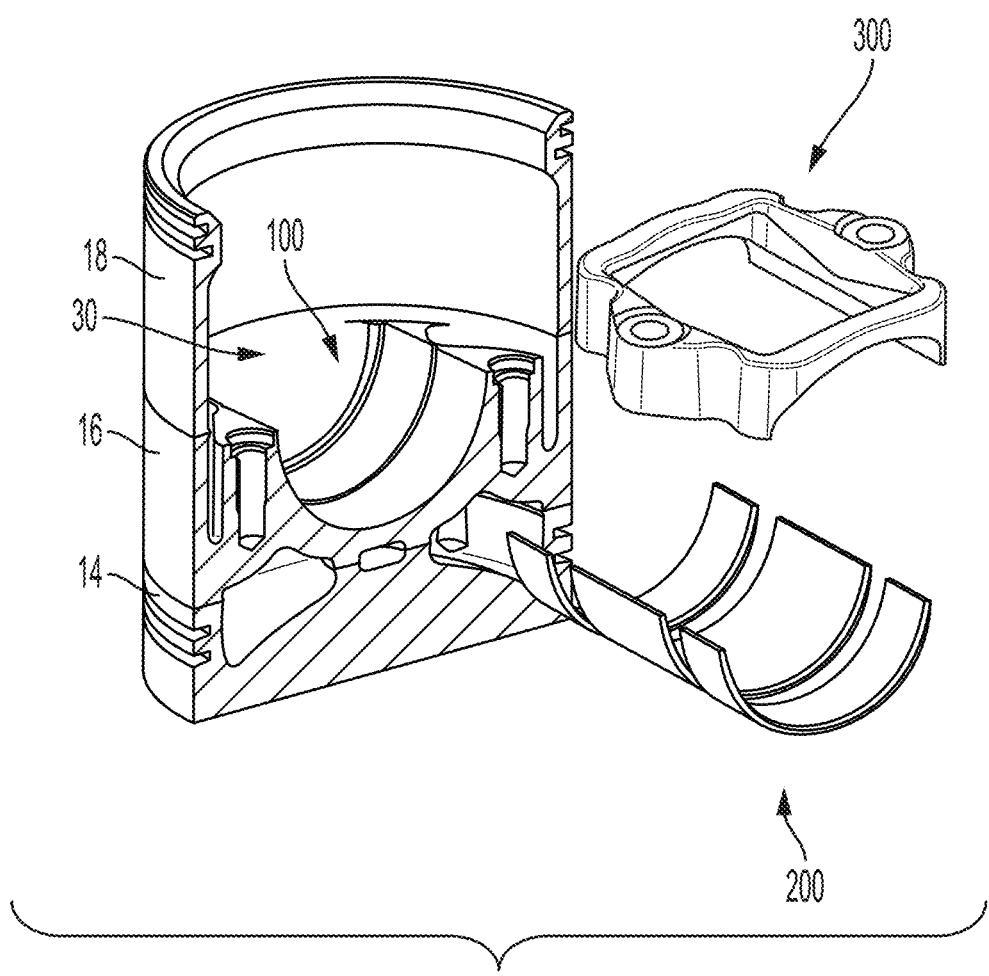
FIG. 6 is an exploded view of a bearing and clamp with a cross section of the crown, body, and skirt of a piston, according to one embodiment.

FIG. 6 provides an exploded view of the bearing 200 and clamp 300 in relation to a sectional view of the crown 14, body 16, and skirt 18 of a piston prior to assembly. As is seen in the embodiment depicted in FIG. 6, the exterior walls of the body 16 of the piston 10 extend beyond the coupling portion 30. During manufacture, the coupling portion 30, and specifically the bearing saddle 110 may be formed by machining the body 16. In order to machine the bearing saddle 110, the coupling portion 30 may be accessed at one of the axial ends of the body 16 of the piston. Because the piston 10 implements a clamp 300, the pin 400 (seen in FIG. 5) is secured to the body 16 of the piston without having a through hole formed through either the body 16 or skirt 18 of the piston 10. This may provide greater stability, flexibility, and durability for the piston 10 (e.g., piston skirt flexibility). It is within the scope of this disclosure to include other designs that can modify the manufacturing process, some embodiments including the aforementioned throughhole, or other embodiments that are modified to provide access to the coupling portion 30 for manufacturing.

Figure 7:
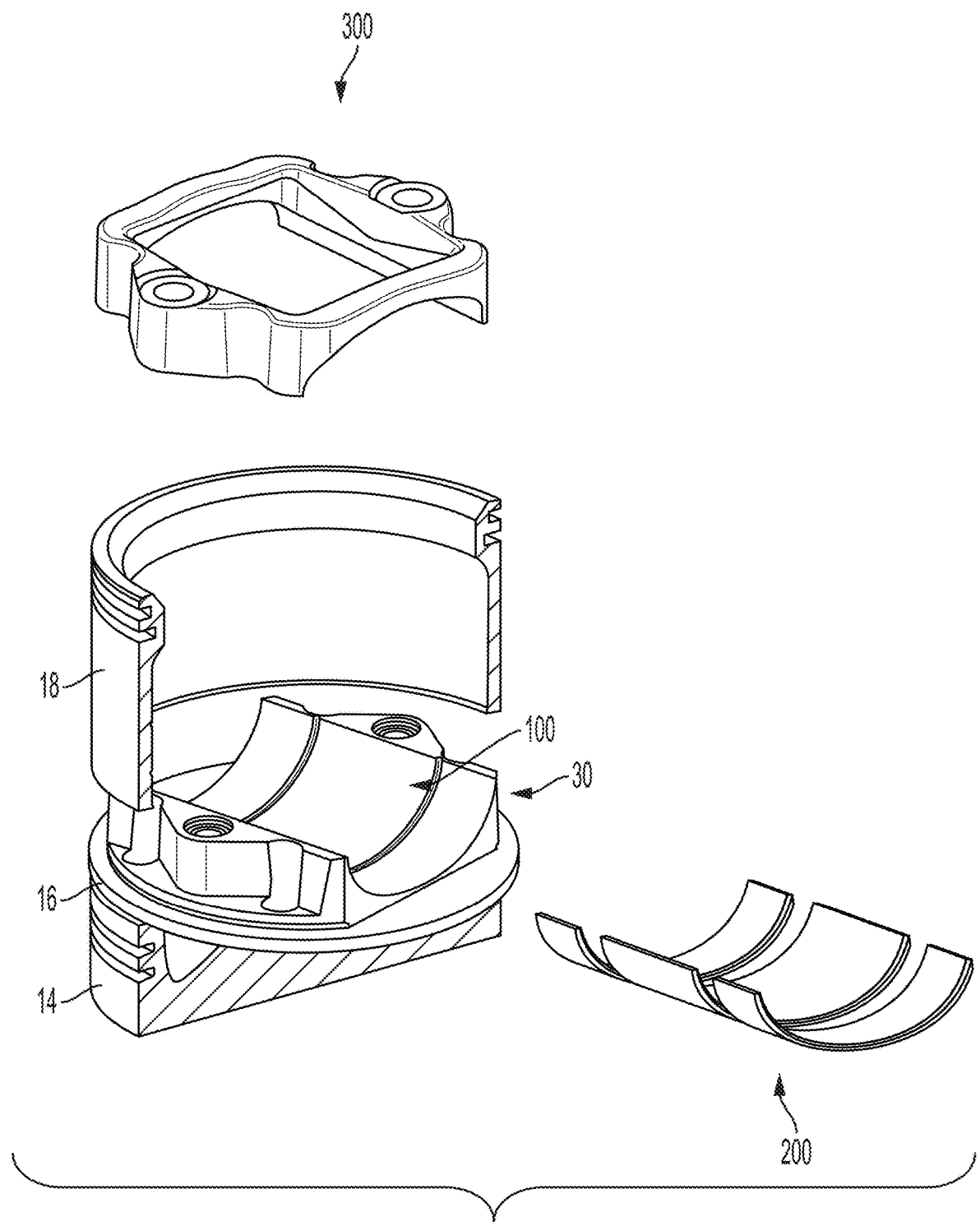
FIG. 7 is an exploded view of a piston, where the body of the piston includes an exposed coupling portion, according to one embodiment.

For example, FIG. 7 provides an embodiment in which the body 16 of the piston 10 does not include exterior walls that extend beyond the coupling portion 30. This may allow access to the coupling portion 30 in order to precisely machine the bearing saddle 110 and other features described herein. In this embodiment, the skirt 18 of the piston 10 may be substantially surrounding the bearing saddle 110, the bearing 200, the clamp 300, and the pin 400 (shown in FIG. 5) when assembled. FIG. 7 shows an embodiment of a piston 10 having a weld joint between body 16 and the skirt 18 positioned closer to the crown 14 when compared the embodiment shown in FIG. 6, where the weld joint between body 16 and the skirt 18 is spaced further from the crown 14.

Figure 8:
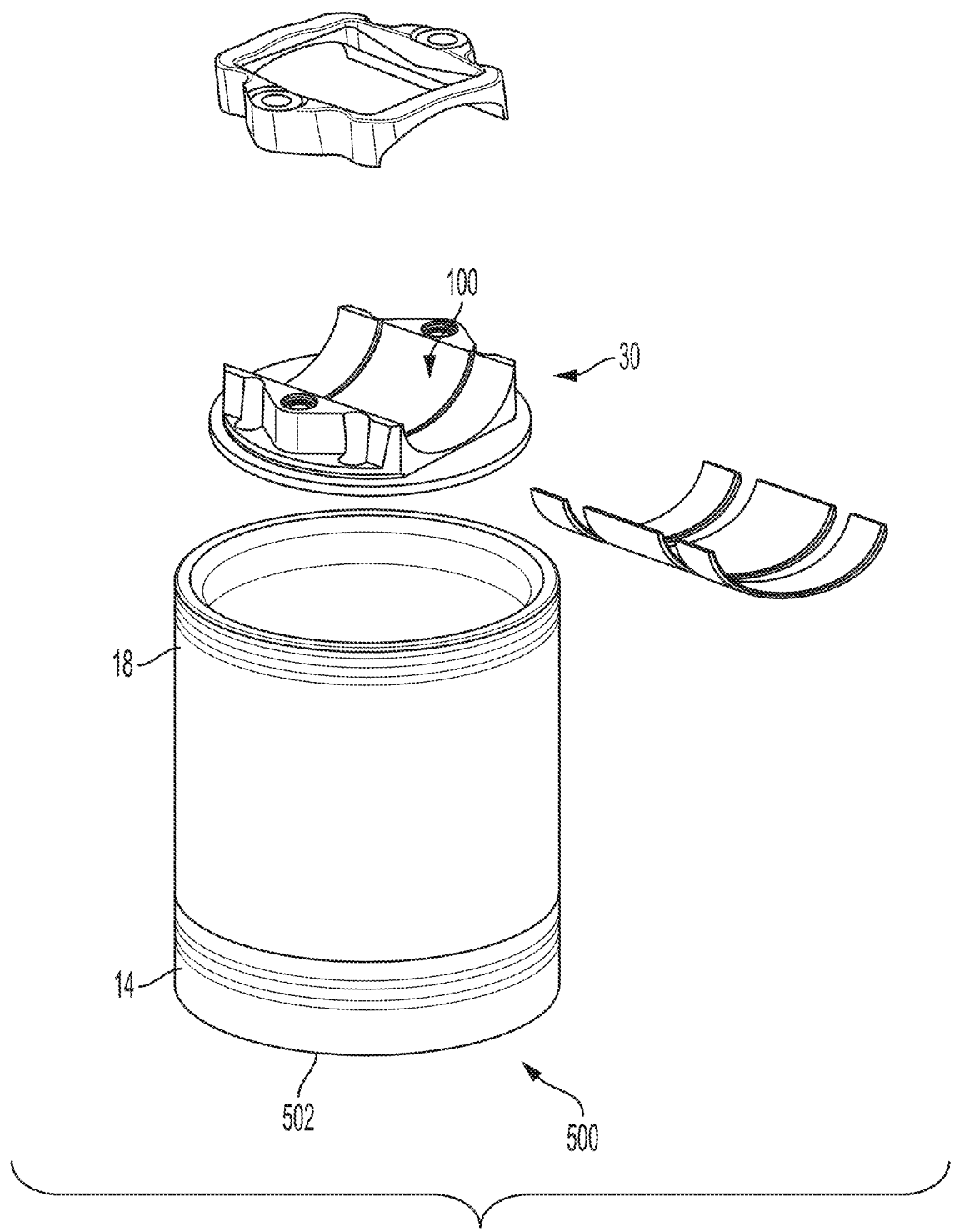
FIG. 8 is an exploded view of a piston, where the coupling portion is inserted into the interior of the piston skirt and/or body, according to one embodiment.

FIG. 8 provides another embodiment in which the bearing saddle 110 and/or coupling portion 30 may be formed separate from the body 16 of the piston. The bearing saddle and/or coupling portion 30 may be inserted into the interior 100 of the piston 10 through the skirt 18. In embodiments where the bearing saddle 110 and/or coupling portion 30 may be dropped into the piston 10, the piston 10 may be formed of one or more components. For example, the piston 10 may be formed of a piston crown 14 that has an integral skirt extending therefrom. In another example, the piston may be formed of a piston crown 14 coupled to a piston skirt 18 without a piston body included.

It is understood that the various components discussed herein may be formed of various materials and by various processes. In some embodiments, it may be advantageous to form a first component (e.g., the crown 14 of the piston 10) via additive manufacturing processes (e.g., metal three-dimensional printing). This can also allow for other considerations to be made to improve performance of the piston 10 (e.g., avoid the use of a steel skirt reduces mass of the piston and allows for improved skirt flexibility). The disclosed embodiments account for such considerations (e.g., simplified manufacture of parts experiencing greater stress, such as higher loads, that are kinematic, or both). Therefore, the various components may be individually formed or formed in combination via various manufacturing methods including, but not limited to, casting, forging, machining, or additive manufacturing. It is also understood that the various components can be treated or coated using various materials and methods. For example, the bearing 200 may be coated for improved performance (e.g., lead, tin, nickel, and/or polymer coatings).

Piston Bowl

Turning now to a discussion of a piston bowl 500, a piston bowl may be formed in the crown 14 of the piston 10 (as seen in FIG. 8). The piston bowl 500 includes a combustion surface 502 that may function to form at least a portion of the outer boundary of a combustion chamber 550. By modifying the surface contours of the combustion surface 502, the efficiency of the engine may be increased.

Although various embodiments of a combustion surface 502 will be described in relation to an opposed piston engine, similar features may be included in various other engines. The opposed piston engine is specifically discussed as the combustion chamber 550 is formed on at least two sides by the combustion surfaces 502 of opposing piston crowns 14. Because the piston crowns 14 form the combustion surfaces 502 and the boundaries of the combustion chamber 550, from a manufacturing perspective, it might be advantageous to provide a single design that may be used on both of the opposing pistons in an opposed piston engine, which reduces cost and improves efficiency of assembly. However, the combustion surfaces forming the combustion chamber 550 may be implemented in other engines, as the features described herein include advantages in addition to the advantage of having a single design for two parts.

FIGS. 9-12 will be discussed in more detail. It will be understood that although the combustion surfaces are not explicitly shown in these figures, the combustion chamber 550 shapes and contours that are shown are specifically defined by and enabled by the combustion surfaces of the piston crowns 14 and/or other components defining the contours of the combustion chamber 550.

Figure 9A:
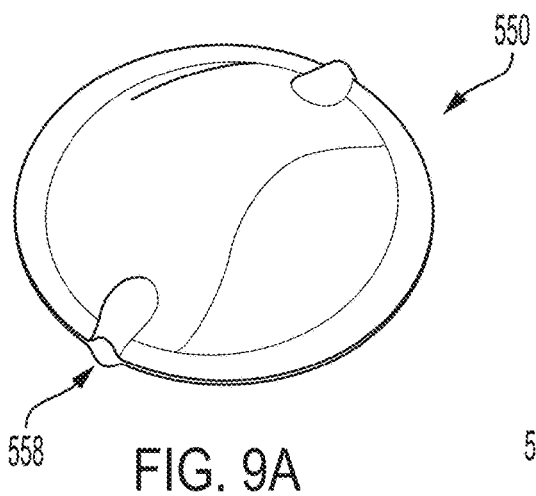
FIGS. 9A-9C show various views of a symmetric combustion chamber, according to one embodiment.
Figure 9B:
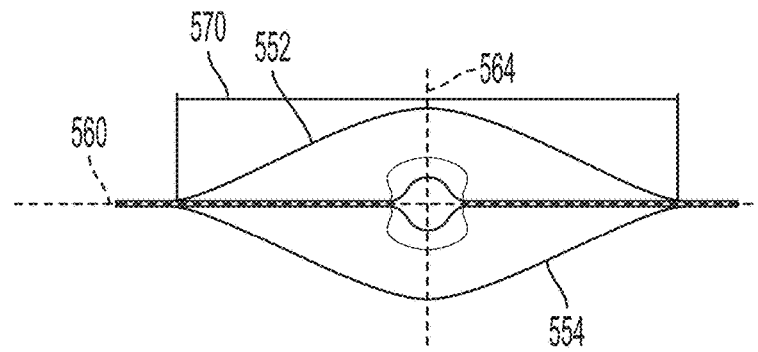
Figure 9C:
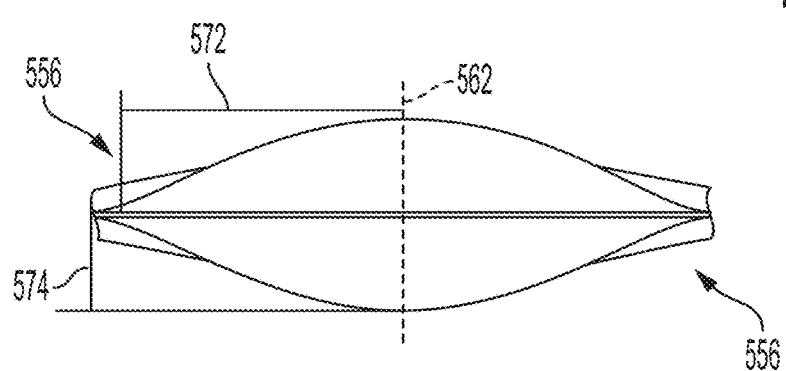

Referring now to FIGS. 9A-9C, an embodiment of a combustion chamber 550 is provided. The combustion chamber 550 of FIG. 9 includes a top bowl 552, a bottom bowl 554, and lateral ends 556. The lateral ends 556, in some embodiments, may be the area at which the air/fuel mixture is introduced into the combustion chamber 550 and/or ignition originates in the combustion chamber 550. This area may be referred to as a middle trench 558. The combustion chamber 550 of FIG. 9 may be shaped such that the combustion chamber 550 is symmetric across a first plane 560 bisecting the top and bottom bowls 552, 554. The combustion chamber 550 may also be shaped such that the combustion chamber 550 is symmetric across a second plane 562 that bisects the combustion chamber 550 between the lateral ends 556, such that the first and second planes 560, 562 are perpendicular to each other. The combustion chamber 550 may also be shaped such that the combustion chamber 550 is symmetric across a third plane 564 that bisects the combustion chamber 550, where the third plane 564 is perpendicular to both the first and second planes 560, 562. By having the combustion chamber 550 symmetric about three planes 560, 562, 564, the combustion chamber 550 (for example, as shown in FIG. 9) may be formed when the two components (e.g., two piston crowns 14 having the same combustion surface 502) are placed opposing each other and where the features (e.g., the middle trenches 558) are aligned with one another. The deepest location of the piston bowls 552, 554 is in the center of the each of the respective piston bowls 552, 554. In some embodiments, the ratio of the width 570 of the piston bowls 552, 554 to the bore radius 572 is from about 0.77 to about 0.87 (e.g., approximately 0.82). In some embodiments, the ratio of the depth 574 of the bowl to the width 570 of the bowl is from about 0.3 to about 0.42 (e.g., approximately 0.37). In some embodiments, the radius of the round between the trenches 558 and bowl shape varies from about 20 mm to about 40 mm at the top of the trench 558 and from about 0 mm to about 15 mm at the sides of the trenches 558. It is understood that the bowl shape can used independent of the injector trench shape.

The combustion chamber shape formed by the piston bowls 552, 554 as shown in FIG. 9 is operable to reduce piston temperatures while maintaining high levels of performance. The combustion chamber shape also is operable to have high thermal efficiency, low heat losses, and low soot emissions. Due to the symmetric nature of the combustion chamber 550 as proscribed by the symmetric nature of the piston bowl shape, manufacturability is increased.

Referring now to FIG. 10, another embodiment of a combustion chamber 550 is provided. The combustion chamber 550 of FIG. 10 likewise includes a top bowl 552, a bottom bowl 554, and lateral ends 556. The lateral ends 554, in some embodiments, may be the area at which the air/fuel mixture is introduced into the combustion chamber 550 and/or ignition originates in the combustion chamber 550. This area may be referred to as a middle trench 558. The combustion chamber 550 of FIG. 10 may be shaped such that the combustion chamber 550 includes a ridge 580 positioned at a mid-section on at least one of the bowls 552, 554 between the lateral ends 556 of the combustion chamber 550. The ridge 580 may consist of either a single shape or a combination of two or more curved or straight shapes. The ridge 580 may also be either straight or contoured to the piston bowl shape. The ratio of the height 582 of the ridge 580 to the maximum depth 574 of the bowls 552, 554 may be from about 0.2 to about 0.3 (e.g., 0.25). The ratio of the maximum depth 574 of the bowl to the width 570 of the bowl may be from about 0.33 to about 0.43 (e.g., 0.38). The ratio of the width 570 of the bowl to the bore radius is from about 0.75 to about 0.85 (e.g., 0.8). The radii of rounds along the ridge 580 can range from about 0 mm to about 10 mm at the peak 584 of the ridge 580 and from about 5 mm to about 20 mm between the ridge 580 and the rest of the bowl shape. The bowl shape shown in FIG. 10 can have an offset in the location of maximum depth 574 of the bowl from about 0 mm to about 10 mm from the centerline of the bowl shape. The piston bowl shape can be independent of the injector trench shape.

The ridge 580 in the piston bowl shape of FIG. 10 is operable to interact with fuel and/or flame in order to redirect the fuel and/or flame into different locations within the gas volume. This allows for improved mixing, better combustion, and redirects some of the flame away from the pistons, which reduces heat transfer to the pistons. The piston bowl shape of FIG. 10 increases thermal efficiency while reducing heat losses.

Figure 11B:
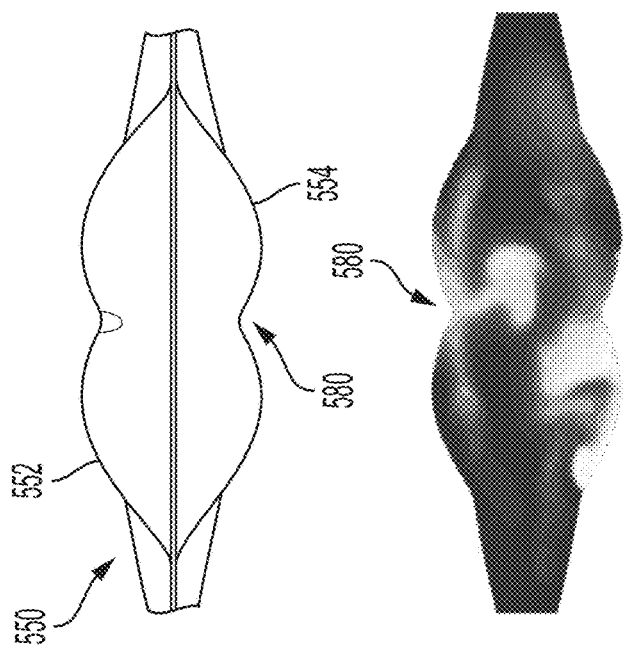
FIGS. 11A and 11B show a comparison of contour plot of the combustion chambers of FIGS. 9 and 10, respectively, according to some embodiments.
Figure 11A:
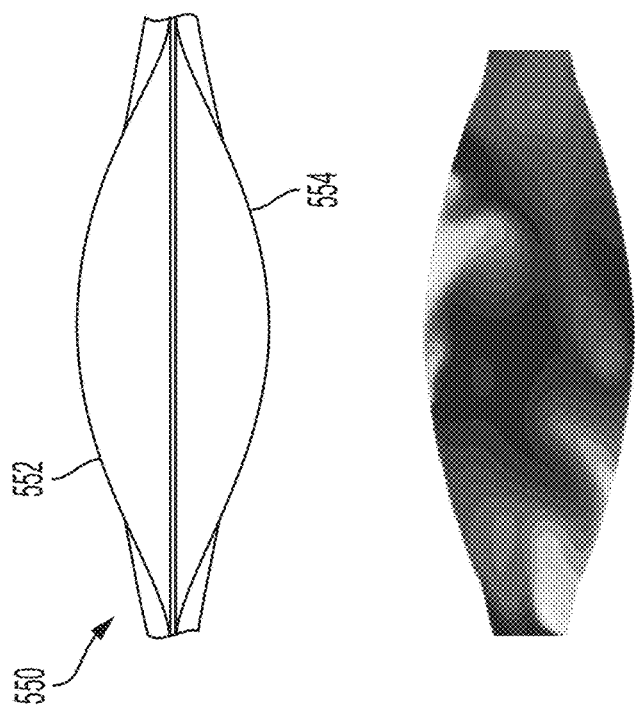

FIG. 11 shows a comparison of a contour plot of the combustion chamber 550 of FIG. 9 (FIG. 11A) next to a contour plot of the combustion chamber 550 of FIG. 10 (FIG. 11B). As can be seen in the contour plot as shown in FIG. 11B, the surface features of the piston bowls 552, 554, including the ridge 580 redirect an injection charge away from the combustion surface 502.

Figure 12A:
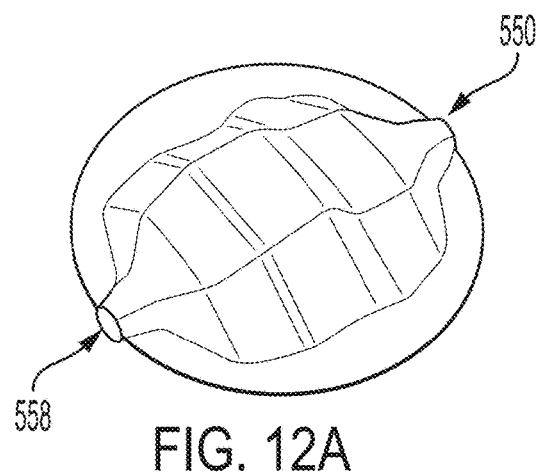
FIGS. 12A-12C show various views of a combustion chamber having deep and shallow sections, according to one embodiment.
Figure 12B:
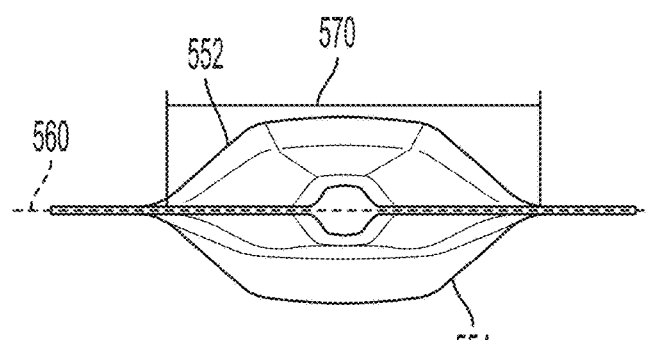
Figure 12C:
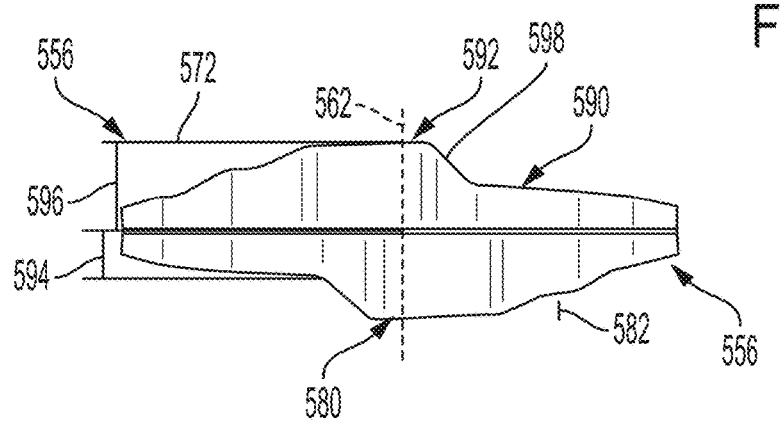

Referring now to FIG. 12, another embodiment of a combustion chamber 550 is provided. The combustion chamber of FIG. 12 likewise includes a top bowl 552, a bottom bowl 554, and lateral ends 556. The lateral ends 554, in some embodiments, may be the area at which the air/fuel mixture is introduced into the combustion chamber 550 and/or ignition originates in the combustion chamber 550. This area may be referred to as a middle trench 558. The combustion chamber 550 of FIG. 12 may be shaped such that each bowl 552, 554 has two main sections, a shallow section 590 and a deep section 592. The ratio of the depth 594 of the shallow section 590 to the depth 596 of the deep section 592 is from about 0.54 to about 0.64 (e.g., 0.59). A ramp 598 connects the depth of the two section 590, 592. The shallow section 590 and the deep section 592 represent from about 31% to about 41% (e.g., 36%) and from about 50% to about 60% (e.g., 55%) of the bore diameter, respectively. The ramp 598 transitions between the shallow and deep sections 590, 592 of the bowl in the remaining about 4% to about 14% (e.g., 9%) of the bore radius. The ratio of the width 570 of the bowl to the bore radius 572 is from about 0.57 to about 0.67 (e.g., 0.62). The bowl shape can be used independent of the injector trench shape.

The combustion chamber of FIG. 12 is operable to improve performance, reduce emissions, and lower heat loss by redirecting the fuel and/or flame to different parts of the combustion chamber in order to improve mixing and combustion performance. The combustion chamber of FIG. 12 has low local heat losses, resulting in lower peak piston temperatures. Although the combustion chamber of as shown in FIG. 12 is provided with straight line geometries at certain positions, it is contemplated that the straight lines and intersections of those straight lines could be provided with curves and more smooth or subtle transitions.

Figure 13A:
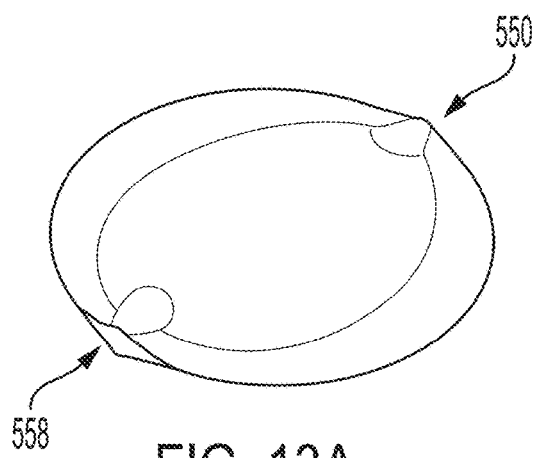
FIGS. 13A-13C show various views of a combustion chamber with symmetry, according to one embodiment.
Figure 13B:
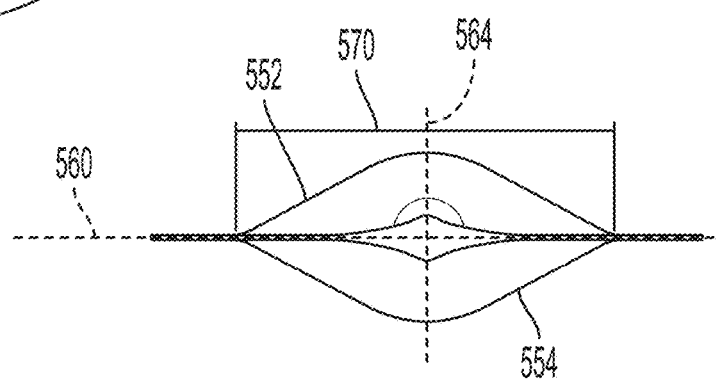
Figure 13C:
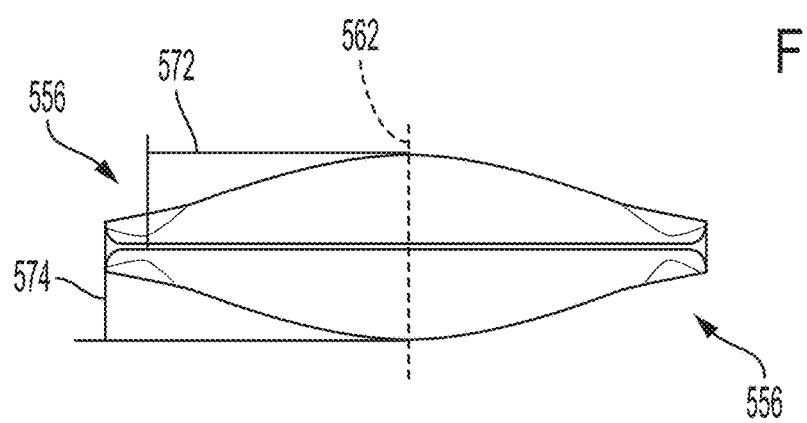

Referring now to FIGS. 13A-13C, an embodiment of a combustion chamber 550 is provided. The combustion chamber 550 of FIG. 13 includes a top bowl 552, a bottom bowl 554, and lateral ends 556. The lateral ends 556, in some embodiments, may be the area at which the air/fuel mixture is introduced into the combustion chamber 550 and/or ignition originates in the combustion chamber 550. This area may be referred to as a middle trench 558. The combustion chamber 550 of FIG. 13 may be shaped such that the combustion chamber 550 is symmetric across a first plane 560 bisecting the top and bottom bowls 552, 554. The combustion chamber 550 may also be shaped such that the combustion chamber 550 is symmetric across a second plane 562 that bisects the combustion chamber 550 between the lateral ends 556, such that the first and second planes 560, 562 are perpendicular to each other. The combustion chamber 550 may also be shaped such that the combustion chamber 550 is symmetric across a third plane 564 that bisects the combustion chamber 550, where the third plane 564 is perpendicular to both the first and second planes 560, 562. By having the combustion chamber 550 symmetric about three planes 560, 562, 564, the combustion chamber 550 (for example, as shown in FIG. 9) may be formed when the two components (e.g., two piston crowns 14 having the same combustion surface 502) are placed opposing each other and where the features (e.g., the middle trenches 558) are aligned with one another. The deepest location of the piston bowls 552, 554 is in the center of the each of the respective piston bowls 552, 554. In some embodiments, the ratio of the width 570 of the piston bowls 552, 554 to the bore radius 572 is from about 0.56 to about 0.80 (e.g., approximately 0.68). In some embodiments, the ratio of the depth 574 of the bowl to the width 570 of the bowl is from about 0.17 to about 0.27 (e.g., approximately 0.22). In some embodiments, the radius of the round between the trenches 558 and bowl shape varies from about 20 mm to about 40 mm at the top of the trench 558 and from about 0 mm to about 15 mm at the sides of the trenches 558. It is understood that the bowl shape can be used independent of the injector trench shape.

The combustion chamber shape formed by the piston bowls 552, 554 as shown in FIG. 13 is operable to reduce piston temperatures while maintaining high levels of performance. The combustion chamber shape also is operable to have high thermal efficiency, low estimated heat rejection, and low soot emissions. Due to the symmetric nature of the combustion chamber 550 as proscribed by the symmetric nature of the piston bowl shape, manufacturability is increased.

Figure 14A:
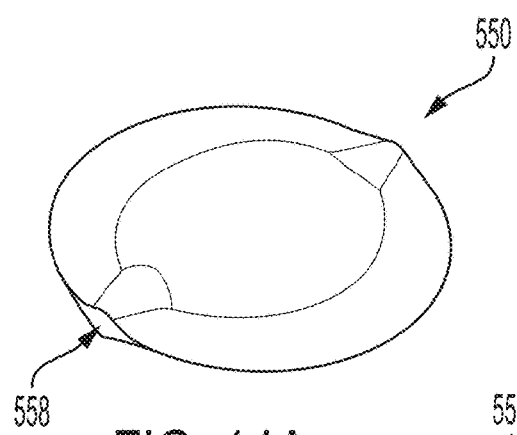
FIGS. 14A-14C show various views of another combustion chamber with symmetry, according to one embodiment.
Figure 14B:
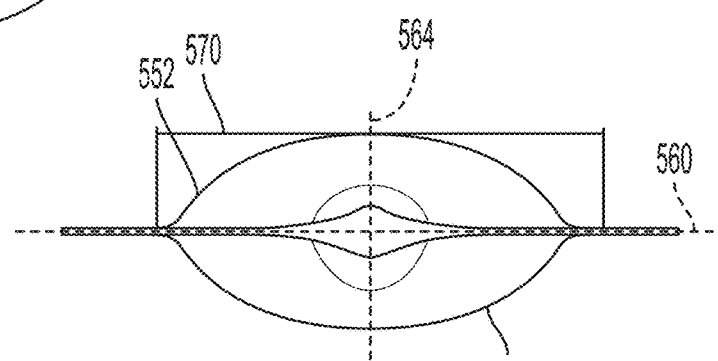
Figure 14C:
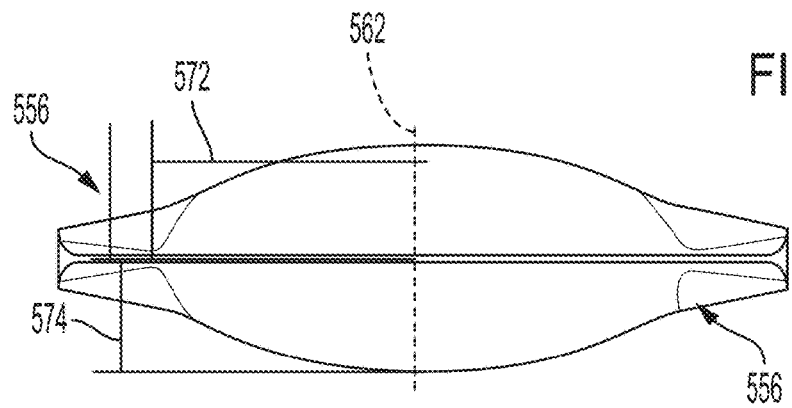

Referring now to FIGS. 14A-14C, an embodiment of a combustion chamber 550 is provided. The combustion chamber 550 of FIG. 14 includes a top bowl 552, a bottom bowl 554, and lateral ends 556. The lateral ends 556, in some embodiments, may be the area at which the air/fuel mixture is introduced into the combustion chamber 550 and/or ignition originates in the combustion chamber 550. This area may be referred to as a middle trench 558. The combustion chamber 550 of FIG. 14 may be shaped such that the combustion chamber 550 is symmetric across a first plane 560 bisecting the top and bottom bowls 552, 554. The combustion chamber 550 may also be shaped such that the combustion chamber 550 is symmetric across a second plane 562 that bisects the combustion chamber 550 between the lateral ends 556, such that the first and second planes 560, 562 are perpendicular to each other. The combustion chamber 550 may also be shaped such that the combustion chamber 550 is symmetric across a third plane 564 that bisects the combustion chamber 550, where the third plane 564 is perpendicular to both the first and second planes 560, 562. By having the combustion chamber 550 symmetric about three planes 560, 562, 564, the combustion chamber 550 (for example, as shown in FIG. 9) may be formed when the two components (e.g., two piston crowns 14 having the same combustion surface 502) are placed opposing each other and where the features (e.g., the middle trenches 558) are aligned with one another. The deepest location of the piston bowls 552, 554 is in the center of the each of the respective piston bowls 552, 554. In some embodiments, the ratio of the width 570 of the piston bowls 552, 554 to the bore radius 572 is from about 0.58 to about 0.70 (e.g., approximately 0.65). In some embodiments, the ratio of the depth 574 of the bowl to the width 570 of the bowl is from about 0.19 to about 0.29 (e.g., approximately 0.24). In some embodiments, the radius of the round between the trenches 558 and bowl shape varies from about 20 mm to about 40 mm at the top of the trench 558 and from about 0 mm to about 15 mm at the sides of the trenches 558. In some embodiments, the width 570 of the bowl and the length of the bowl is from about 0.77 to about 0.89 (e.g., approximately 0.84). It is understood that the bowl shape can used independent of the injector trench shape.

The combustion chamber shape formed by the piston bowls 552, 554 as shown in FIG. 14 is operable to reduce piston temperatures while maintaining high levels of performance. The combustion chamber shape also is operable to have high thermal efficiency, low estimated heat rejection, and low soot emissions. Due to the symmetric nature of the combustion chamber 550 as proscribed by the symmetric nature of the piston bowl shape, manufacturability is increased.

As used herein, the modifier "about" used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range "from about 2 to about 4" also discloses the range "from 2 to 4."

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus While the embodiments have been described as having exemplary designs, the present disclosure may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this invention pertains.

We claim:

1. A piston for an internal combustion engine, comprising:
a piston body including a first bearing saddle defining a first axis and a second bearing saddle defining a second axis, the first axis being parallel to and spaced from the second axis.

2. The piston of claim 1, wherein the first axis of the first bearing saddle is offset from the second axis of the second bearing saddle between 0.1 and 0.3 inches.

3. The piston of claim 1, wherein the first bearing saddle and the second bearing saddle are separated by a recess operable to maintain oil as an oil reservoir.

4. The piston of claim 1, further comprising a third bearing saddle defining a third axis, wherein the first axis of the first bearing saddle and the third axis of the third bearing saddle are aligned.

5. The piston of claim 4, wherein the second bearing saddle is positioned between the first bearing saddle and the third bearing saddle.

6. The piston of claim 4, wherein the first bearing saddle is operable to receive a first bearing journal, the second bearing saddle is operable to receive a second bearing journal, and the third bearing saddle is operable to receive a third bearing journal.

7. A bearing for a piston in an internal combustion engine, the bearing comprising:
a first journal having a first body, longitudinal ends, and lateral edges, the first journal defining a first axis, the first journal disposed about approximately 180 degrees of the first axis, the first journal having a first thickness along the first body, the lateral edges including a chamfer or bevel; and
a second journal having a second body and defining a second axis, the second journal disposed about approximately 180 degrees of the second axis, the second journal having a second thickness along the second body that is substantially similar to the first thickness of the first journal, the second journal operable to be positioned abutting one of the lateral edges of the first journal when the first and second journals are positioned with the piston.

8. The bearing of claim 7, wherein the first journal is tapered such that the first thickness of the first body is greater in a middle portion of the first journal than at longitudinal ends of the first journal, and wherein the second journal is tapered such that the second thickness of the second body is greater in a middle portion of the second journal than at longitudinal ends of the second journal.

9. The bearing of claim 7, wherein the first journal and the second journal each includes a beveled or chamfered edge at the lateral edges.

10. The bearing of claim 9, wherein the beveled or chamfered edge is operable to act as a circumferential oil loading channel.

11. The bearing of claim 7, further comprising a third journal having a third body, longitudinal ends, and lateral edges, the third journal defining a third axis, the third journal disposed about approximately 180 degrees of the third axis, the third journal having a third thick mess along the third body.

12. A piston for an internal combustion engine, the piston comprising:
a piston body including a bearing saddle;
a bearing positioned with the bearing saddle;
a clamp for retaining the bearing with the bearing saddle;
wherein the clamp includes a pin receiving surface; and
a pin positioned within the pin receiving surface of the clamp;
wherein the pin receiving surface is configured to load lubricant between the pin and the pin receiving surface.

13. The piston of claim 12, wherein the clamp includes a clamp body having a first side, a second side, axial ends, and lateral ends, the first side including the pin receiving surface defining a pin recess.

14. The piston of claim 13, wherein the pin receiving surface forms a substantially arcuate shape.

15. The piston of claim 13, wherein the pin receiving surface is formed of a plurality of arcs, each arc being disposed about a separate axis spaced from an adjacent axis of an adjacent arc.

16. The piston of claim 15, wherein the pin receiving surface includes at least one transition ridge between the each of the plurality of arcs.

17. The piston of claim 16, wherein the transition ridge is operable to allow a pin to transition between different positions to allow for lubricant loading.

18. The piston of claim 13, wherein the clamp defining a connecting rod opening defined through the clamp body, the clamp body including tapered surfaces at the connecting rod opening.

19. An internal combustion engine comprising:
a piston having a piston crown defining a first combustion surface, the first combustion surface being symmetric across a first plane and across a second plane, the first plane being perpendicular to the second plane;
wherein the piston further includes a clamp:
wherein the clamp includes a pin receiving surface; and
a pin positioned with the pin receiving surface of the clamp;
wherein the pin receiving surface is configured to load lubricant between the pin and the pin receiving surface; and
an opposing member positioned opposing the piston crown, the opposing member defining a second combustion surface, the second combustion surface being symmetric to the first combustion surface of the piston crown.

20. The piston of claim 12 further comprising:
a piston crown including first and second longitudinal ends, the piston crown defining a combustion surface including a ridge positioned between the first and second longitudinal ends of the piston crown, the ridge, being formed to redirect an injection charge away from the combustion surface.

* * * * *